(12) United States Patent
Liu et al.

(10) Patent No.: US 12,267,276 B2
(45) Date of Patent: Apr. 1, 2025

(54) INFORMATION INDICATION METHOD AND APPARATUS AND STORAGE MEDIUM

(71) Applicant: ZTE CORPORATION, Shenzhen (CN)

(72) Inventors: Xing Liu, Shenzhen (CN); Chuangxin Jiang, Shenzhen (CN); Peng Hao, Shenzhen (CN); Yu Ngok Li, Hong Kong (CN); Shujuan Zhang, Shenzhen (CN); Mengzhu Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 553 days.

(21) Appl. No.: 17/776,593

(22) PCT Filed: Aug. 12, 2020

(86) PCT No.: PCT/CN2020/108581
§ 371 (c)(1),
(2) Date: May 12, 2022

(87) PCT Pub. No.: WO2021/052067
PCT Pub. Date: Mar. 25, 2021

(65) Prior Publication Data
US 2022/0407655 A1  Dec. 22, 2022

(30) Foreign Application Priority Data
Sep. 20, 2019  (CN) .......................... 201910894189.6

(51) Int. Cl.
*H04L 5/00*  (2006.01)

(52) U.S. Cl.
CPC .................. *H04L 5/0053* (2013.01)

(58) Field of Classification Search
CPC ..... H04L 5/0053; H04L 5/0091; H04L 5/005; H04L 5/0023; H04L 5/0051; Y02D 30/70;
(Continued)

(56) References Cited

U.S. PATENT DOCUMENTS 10,805,872 B2 * 10/2020 Yi ........................... H04L 5/005
11,432,365 B2 * 8/2022 Takeda .............. H04W 72/1273
(Continued)

FOREIGN PATENT DOCUMENTS

| CN | 106717092 A | 5/2017 |
|---|---|---|
| CN | 109479277 A | 3/2019 |

(Continued)

OTHER PUBLICATIONS

Second Chinese Office Action with English translation of the Office Action regarding Application No. 201910894189.6 dated Jan. 19, 2024, 9 pages.
(Continued)

*Primary Examiner* — Abdullahi E Salad
(74) *Attorney, Agent, or Firm* — Crowell & Moring LLP

(57) ABSTRACT

Provided are an information indication method and apparatus and a storage medium. The information indication method includes: receiving first configuration information sent by a first communication node; determining corresponding second configuration information according to a predefined conversion rule and the first configuration information, where each of the first configuration information and the second configuration information includes at least one of control resource set configuration information, search space configuration information, demodulation reference signal (DMRS) configuration information or a cellbarred indicator field in master information block (MIB) information; and receiving system information according to an indication of the second configuration information.

16 Claims, 6 Drawing Sheets

(58) Field of Classification Search
CPC ..... H04W 24/02; H04W 48/08; H04W 48/16; H04W 48/02

See application file for complete search history.

(56) References Cited

U.S. PATENT DOCUMENTS

| | | | | |
|---|---|---|---|---|
| 2019/0159180 | A1* | 5/2019 | Ly | H04L 5/0048 |
| 2020/0059912 | A1* | 2/2020 | Shen | H04L 5/0094 |
| 2021/0136663 | A1 | 5/2021 | Liu et al. | |
| 2021/0368493 | A1* | 11/2021 | Lin | H04L 5/0053 |
| 2022/0224470 | A1* | 7/2022 | Matsumura | H04B 7/0404 |

FOREIGN PATENT DOCUMENTS

| | | | |
|---|---|---|---|
| CN | 109756449 | A | 5/2019 |
| CN | 109842917 | A | 6/2019 |
| CN | 110602731 | A | 12/2019 |
| EP | 3706381 | A1 | 9/2020 |
| EP | 4002739 | A1 | 5/2022 |
| EP | 4120611 | A1 | 1/2023 |
| WO | WO-2019032028 | A1 | 2/2019 |
| WO | WO-2019/085770 | A1 | 5/2019 |
| WO | WO-2021/022435 | A1 | 2/2021 |

OTHER PUBLICATIONS

European Patent Office Office Action regarding Application No. 20 866 491.2 dated Oct. 1, 2024, 6 pages.

Chinese Office Action with English translation regarding Application No. 201910894189.6 dated May 14, 2024, 13 pages.

Office Action in Chinese Application No. 201910894189.6 dated May 27, 2023, 12 pages, including translation.

Search Report in Chinese Application No. 201910894189.6 dated May 25, 2023, 5 pages, including translation.

Korean Office Action with English summary of the Office Action regarding Application No. 10-2022-7013137 dated May 22, 2024, 7 pages.

Extended European Search Report in Application No. 20866491.2 dated Sep. 22, 2023, 10 pages.

Indonesian Office Action and English translation regarding P00202204469 dated Jan. 31, 2024, 4 pages.

International Search Report for Application No. PCT/CN2020/108581, dated Nov. 19, 2020, 4 pages including English translation.

Samsung, "Wider Bandwidth Operations", 3GPP TSG RAN WG1 NR Meeting #90 R1-1713654, Aug. 26, 2017 (Aug. 26, 2017), entire document.

European Patent Office Office Action regarding 20 866 491.2 dated Dec. 11, 2024, 4 pages.

Korean Office Action with English summary regarding 10-2022-7013137 dated Jan. 24, 2025, 6 pages.

* cited by examiner

INFORMATION INDICATION METHOD AND APPARATUS AND STORAGE MEDIUM

CROSS-REFERENCES TO RELATED APPLICATIONS

This application is a U.S. National Stage Application, filed under 35 U.S.C. 371, of International Patent Application No. PCT/CN2020/108581, filed on Aug. 12, 2020, which claims priority to Chinese Patent Application No. 201910894189.6 filed with the China National Intellectual Property Administration (CNIPA) on Sep. 20, 2019, the disclosures of which are incorporated herein by reference in their entireties.

TECHNICAL FIELD

The present application relates to the field of communication and, in particular, to an information indication method and apparatus and a storage medium.

BACKGROUND

Compared with a conventional system, a New Radio (NR) system has higher configuration flexibility and accordingly, imposes a higher requirement on a capability of a terminal. As defined in standards, a conventional NR terminal has to support basic capabilities, such as a bandwidth capability, that is, the terminal has to support initial access-related signal channel bandwidths in all configurations and the like. It still requires higher costs to support even these basic capabilities. However, not all of various scenarios supported by the NR system require such high capabilities of the terminal. For example, such devices as a smart wearable device and an industrial sensor do not need to support the transmission of a large bandwidth in a typical communication scenario. Therefore, for such scenarios, a terminal device type with a lower capability such as a smaller bandwidth and a smaller number of antennas is defined, so as to reduce the production cost of the terminal and reduce energy consumption during the operation of the terminal. Such terminal may be referred to as a low configuration terminal or an NR lite user equipment (UE).

In an NR network, to be compatible with the access of the low configuration terminal, when a network side configures an initial access-related signal channel, a configuration beyond the bandwidth capability of the low configuration terminal cannot be implemented. It is unfair for a conventional terminal referring to the configuration flexibility limitation since the conventional terminal cannot achieve a performance gain resulting from a larger bandwidth.

SUMMARY

The present application provides an information indication method and apparatus and a storage medium so that a conventional terminal and a low configuration terminal share the same configuration information and access a network simultaneously.

Embodiments of the present application provide an information indication method including the following.

First configuration information sent by a first communication node is received.

Corresponding second configuration information is determined according to a predefined conversion rule and the first configuration information, where each of the first configuration information and the second configuration information includes at least one of control resource set configuration information, search space configuration information, demodulation reference signal (DMRS) configuration information or a cellbarred indicator field in master information block (MIB) information.

System information is received according to an indication of the second configuration information.

Embodiments of the present application further provide an information indication method including the following.

First configuration information is sent to a second communication node.

System information is sent according to second configuration information determined according to a predefined conversion rule and the first configuration information, where each of the first configuration information and the second configuration information includes at least one of control resource set configuration information, search space configuration information, DMRS configuration information or a cellbarred indicator field in MIB information.

Embodiments of the present application further provide an information indication apparatus including a first receiving module, a first determination module and a second receiving module.

The first receiving module is configured to receive first configuration information sent by a first communication node.

The first determination module is configured to determine corresponding second configuration information according to a predefined conversion rule and the first configuration information, where each of the first configuration information and the second configuration information includes one of control resource set configuration information, search space configuration information, DMRS configuration information or a cellbarred indicator field in MIB information.

The second receiving module is configured to receive system information according to an indication of the second configuration information.

Embodiments of the present application further provide an information indication apparatus including a first sending module and a second sending module.

The first sending module is configured to send first configuration information to a second communication node.

The second sending module is configured to send system information according to an indication of second configuration information determined according to a predefined conversion rule and the first configuration information, where each of the first configuration information and the second configuration information includes at least one of control resource set configuration information, search space configuration information, DMRS configuration information or a cellbarred indicator field in MIB information.

Embodiments of the present application further provide a storage medium. The storage medium stores a computer program which, when executed by a processor, implements the information indication method in any one of the preceding embodiments.

DETAILED DESCRIPTION

Embodiments of the present application are described below in conjunction with drawings.

In an NR system, a UE firstly receives time and frequency domain resources of access-related signal channels such as a Synchronization Signal/Physical Broadcast CHannel Block (SSB) for carrying a synchronization signal and a physical broadcast channel (and the corresponding demodulation reference signal (DMRS)).

Figure 1:
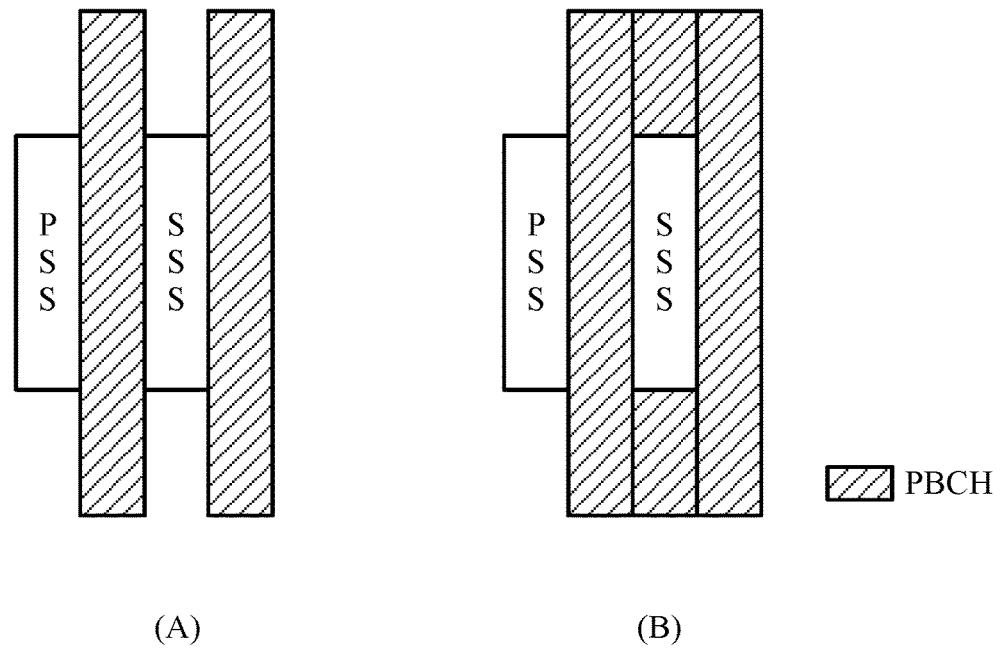
FIG. 1 is a schematic diagram of an internal structure of an SSB according to an embodiment of the present application.

FIG. 1 is a schematic diagram of an internal structure of an SSB according to an embodiment of the present application. As shown in FIG. 1, the SSB includes four symbols, where a primary synchronization signal (PSS) and a secondary synchronization signal (SSS) are carried on a first symbol and a third symbol, respectively, and a synchronization signal sequence is mapped on 127 resource elements (REs) therein, separately. As shown in FIG. 1(A), in some configurations, the physical broadcast channel (PBCH) is carried only on a second symbol and a fourth symbol in the SSB. Alternatively, as shown in FIG. 1(B), in some other resource configurations, the PBCH is mapped on the second, third and fourth symbols in the SSB. For example, the number of REs occupied on each symbol is as follows: 240 REs are occupied on each of the second symbol and the fourth symbol, and 96 REs, 48 REs on each side of the SSB, on the third symbol are occupied by the PBCH. For example, PBCH DMRSs are mapped on some REs of all or part of PBCH RBs. For example, the PBCH DMRSs are mapped with a density of ¼ (that is, one DMRS RE is mapped every four REs).

In the above configurations, center frequencies of the synchronization signal and the PBCH are aligned. The SSB may also be extended to a time domain structure with more symbols. For example, one or two PBCH symbols are added on the basis of FIG. 1(A) or FIG. 1(B) to carry more broadcast information. The added symbols may be inserted at any position of the four-symbol SSB structure.

Multiple SSBs are included in one cell to implement coverage within an expected range. Multiple SSBs in one transmission period are numbered in a time domain sequence, that is, the SSBs have indexes i from 0 to $L_{max}-1$, where $L_{max}$ denotes the maximum number of SSBs in the one period.

A master information block (MIB) carried in the PBCH includes receive configuration information of Type0 Physical Downlink Control Channel (Type0 PDCCH) of a system information block 1 (SIB1).

Figure 2:
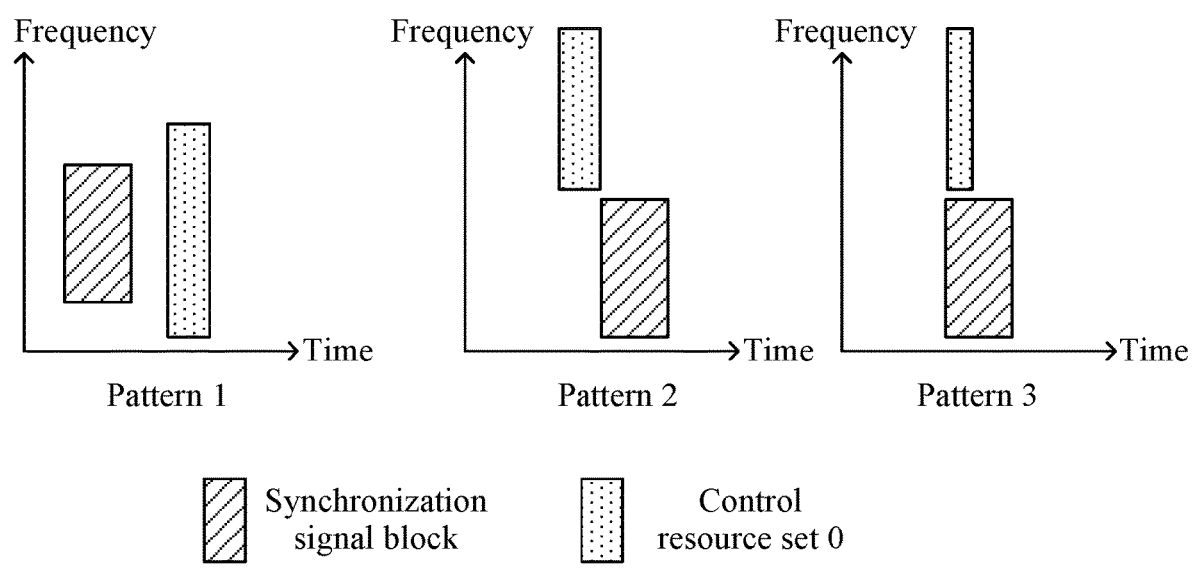
FIG. 2 is a schematic diagram of a multiplexing pattern of an SSB and a CORSET0 according to an embodiment of the present application.

FIG. 2 is a schematic diagram of a multiplexing pattern of an SSB and a CORSET0 according to an embodiment of the present application. As shown in FIG. 2, a control resource set 0 (CORESET0) refers to a resource set for carrying the Type0 PDCCH. In the NR system, time-division multiplexing or frequency-division multiplexing is supported between the CORESET0 and the SSB. There are three multiplexing patterns between the SSB and the CORESET0, which are a pattern1, a pattern2 and a pattern3, respectively. In the pattern1, the CORESET0 and the SSB are time-division multiplexed, that is, the CORESET0 and the SSB occupy different time domain resources, and in the frequency domain dimension, the CORESET0 includes the SSB. In the pattern2 and the pattern3, the SSB and the CORESET0 occupy different frequency resources in the frequency domain dimension. A difference is that in the pattern2, the CORESET0 occupies a symbol before the SSB in time domain; and in the pattern3, the CORESET0 occupies a symbol at which the SSB is located in the time domain.

Table 1 is illustrative of a relationship between subcarrier spacings and the multiplexing patterns of the SSB and the CORESET0. According to a configuration of the NR system, the multiplexing patterns of the SSB and the CORESET0 and subcarrier spacing (SCS) combinations shown in Table 1 are supported within different frequency ranges (FRs). The SSB includes 240 REs, and the CORESET0 supports multiple bandwidth configurations. For example, the bandwidth configurations supported by the CORESET0 include at least one of 24 RBs, 48 RBs or 96 RBs. In Table 1, bandwidths of the SSB and bandwidths of the CORESET0 are listed.

TABLE 1

Relationship between the subcarrier spacings and the multiplexing patterns of the SSB and the CORESET0

|  |  | SCS {SSB, CORESET0}/kHz | Bandwidth of the SSB/MHz | Bandwidth of the CORESET0/MHz |
|---|---|---|---|---|
| FR 1 | Pattern1 Time-division multiplexing between the SSB and the CORESET0 | {15, 15} | 3.6 | 4.32/8.64/17.28 |
|  |  | {15, 30} | 3.6 | 8.64/17.28 |
|  |  | {30, 15} | 7.2 | 8.64/17.28 |
|  |  | {30, 30} | 7.2 | 8.64/17.28 |
| FR 2 | Pattern1 Time-division multiplexing | {120, 60} | 28.8 | 34.56/69.12 |
|  |  | {120, 120} | 28.8 | 34.56/69.12 |
|  |  | {240, 120} | 57.6 | 69.12 |
|  |  | {240, 60} | 57.6 | 69.12 |
|  | Pattern2 Frequency-division multiplexing | {120, 60} | 28.8 | 34.56/69.12 |
|  |  | {240, 120} | 57.6 | 34.56/69.12 |
|  | Pattern3 Frequency-division multiplexing | {120, 120} | 28.8 | 34.56/69.12 |

In the NR system, a conventional terminal needs to support all the bandwidths listed above and thus can access a network under any access parameter configuration of a network side.

A group of tables are defined in standards to be used for a joint indication of configuration parameters of the CORESET0. For example, Table 2 is illustrative of the joint indication of the configuration parameters of the CORESET0. Table 2 is a configuration table of the CORSET0 when the SCS is {15, 15} kHz. Currently applied configurations are indicated by 4 bits in the PBCH, which corresponds to indexes of 0-15 separately. The multiplexing pattern between the SSB and the CORESET0, the number $N_{RB}^{CORESET}$ of RBs in the CORESET0, the number $N_{symb}^{CORESET}$ of symbols in the CORESET0 and a frequency domain offset offset between the CORESET0 and the SSB are indicated, separately, so as to acquire a frequency domain position of the CORESET0.

TABLE 2

Joint indication of the configuration parameters of the CORESET0

| Index | Multiplexing Pattern between the SSB and the CORSET0 | Number of RBs in the CORESET0 ($N_{RB}^{CORESET}$) | Number of Symbols in the CORESET0 ($N_{symb}^{CORESET}$) | Frequency Domain Offset between the CORESET0 and the SSB (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

A bandwidth capability of a low configuration terminal cannot support communication under all configurations. For example, the bandwidth capability of the low configuration terminal is defined as 5 MHz, and when the CORESET0 is configured to be 48 RBs and 96 RBs, the bandwidths are 8.64 MHz and 17.28 MHz, respectively. The low configuration terminal cannot detect the Type0 PDCCH and access the network within the range of the CORESET0 according to the configuration. To be compatible with the access of such terminal (that is, the low configuration terminal), the CORESET0 is configured with a smaller bandwidth, for example, 24 RBs and 4.32 MHz. In this case, the configurations of the CORESET0 having the indexes 6-14 are limited, which affects the performance of the conventional terminal (second-type terminal) accessing the network.

For ease of description, two types of terminals are defined: a first-type terminal and a second-type terminal. The first-type terminal is the low configuration terminal that simplifies a capability of the conventional terminal to a certain extent and cannot support the capability such as the bandwidth that has to be supported by the conventional terminal. The second-type terminal is a terminal with a conventional capability. Meanwhile, two types of base station are defined: a first-type base station and a second-type base station. The first-type base station is a base station that supports the access and operation of the low configuration terminal, for example, a base station of Release 16 or later Releases. Correspondingly, a cell under the first-type base station is referred to as a first-type cell. The second-type base station is a base station that does not support the access and operation of the low configuration terminal, for example, a base station of Release 15 or earlier Releases.

Figure 3:
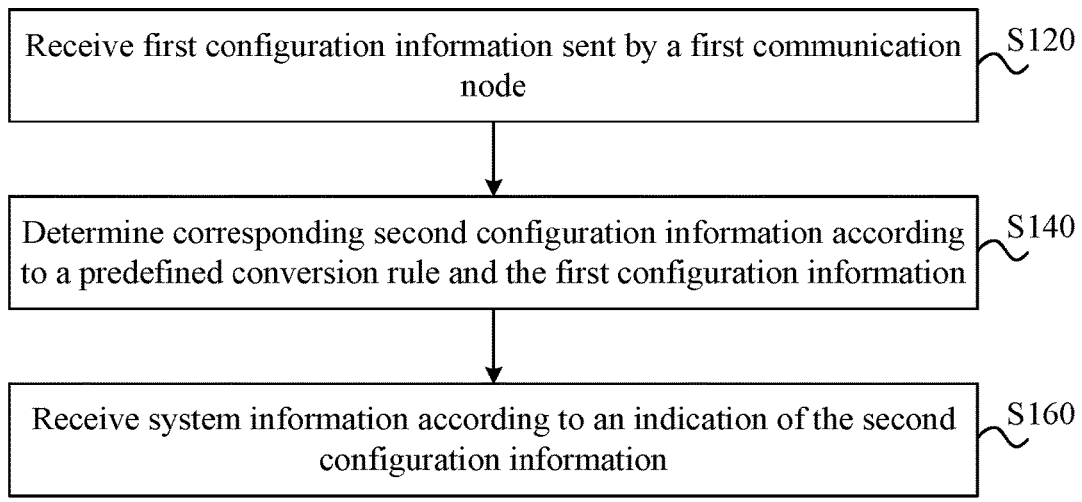
FIG. 3 is a flowchart of an information indication method according to an embodiment of the present application.

FIG. 3 is a flowchart of an information indication method according to an embodiment of the present application. This embodiment is performed by a second communication node. The second communication node is a low configuration terminal that cannot support a bandwidth capability to be supported by a conventional terminal. That is, the second communication node is the first-type terminal in the preceding embodiment, and a second-type terminal is the conventional terminal.

As shown in FIG. 3, the method in this embodiment includes S120 to S160.

In S120, first configuration information sent by a first communication node is received.

In S140, corresponding second configuration information is determined according to a predefined conversion rule and the first configuration information.

Each of the first configuration information and the second configuration information includes at least one of control resource set configuration information, search space configuration information, DMRS configuration information or a cellbarred indicator field in MIB information.

In S160, system information is received according to an indication of the second configuration information.

In an embodiment, the first configuration information and the second configuration information include the same information. That is, the first configuration information includes at least one of the control resource set configuration information, the search space configuration information, the DMRS configuration information or the cellbarred indicator field in the MIB information. The second configuration information corresponds to the first configuration information. That is, in the case where the second configuration information is the control resource set configuration information, the first configuration information is also the control resource set configuration information. In the case where the second configuration information is the search space configuration information, the first configuration information is also the search space configuration information. In the case where the second configuration information is the DMRS configuration information, the first configuration information is also the DMRS configuration information. In the case where the first configuration information is the cellbarred indicator field in the MIB information, the second configuration information is the cellbarred indicator field in the MIB information.

The first communication node is a base station. In an embodiment, the first configuration information refers to original configuration information corresponding to the first-type terminal, and the second configuration information refers to new configuration information corresponding to the first-type terminal. After receiving the original configuration information, the first-type terminal obtains the corresponding new configuration information according to the predefined conversion rule and the original configuration information, receives the next system information according to the indication of the new configuration information, and accesses a network according to access indication information in the system information. In this embodiment, an understanding of a system information bit field by the low configuration terminal is redefined so that on the premise that network configuration flexibility is not limited, the conventional terminal and the low configuration terminal share the same configuration information and access the network simultaneously, avoiding a loss of access performance of the conventional terminal due to a limited access configuration for compatibility with the low configuration terminal.

In an embodiment, the system information includes the access indication information. In an embodiment, the first-type terminal determines whether it can access a current cell according to the access indication information.

In an embodiment, in the case where the second configuration information is the control resource set configuration information, the first configuration information is the control resource set configuration information. That the corresponding second configuration information is determined according to the predefined conversion rule and the first configuration information includes: determining a mapping relationship between first-type configuration indexes and second-type configuration indexes, where the first-type configuration indexes correspond to control resource set configuration information that the first-type terminal cannot support, and the second-type configuration indexes correspond to control resource set configuration information that the first-type terminal can support; in the case where a configuration index corresponding to the first configuration information belongs to the first-type configuration indexes, determining a corresponding configuration index of the second-type configuration indexes according to the mapping relationship; and using configuration information of the corresponding configuration index of the second-type configuration indexes as the corresponding second configuration information.

In an embodiment, the step of determining the mapping relationship between the first-type configuration indexes and the second-type configuration indexes includes one of: determining the mapping relationship between the first-type configuration indexes and the second-type configuration indexes according to a preset mapping rule; predefining the mapping relationship between the first-type configuration indexes and the second-type configuration indexes; or determining the mapping relationship between the first-type configuration indexes and the second-type configuration indexes according to received signaling.

In an embodiment, the step of determining the mapping relationship between the first-type configuration indexes and the second-type configuration indexes includes: determining the mapping relationship between the first-type configuration indexes and the second-type configuration indexes according to the preset mapping rule. That is, the preset mapping rule exists between the first-type configuration indexes and the second-type configuration indexes so that the second-type configuration index can be obtained according to the first-type configuration index. For example, the preset mapping rule may be a calculation formula or a function.

In an embodiment, the step of determining the mapping relationship between the first-type configuration indexes and the second-type configuration indexes includes: predefining the mapping relationship between the first-type configuration indexes and the second-type configuration indexes. That is, the mapping relationship exists between the first-type configuration indexes and the second-type configuration indexes, which may be, for example, a mapping relationship table. That is, the corresponding second-type configuration index is found according to the first-type configuration index. Optionally, the first-type configuration indexes and the second-type configuration indexes have a one-to-one correspondence relationship.

In an embodiment, the step of determining the mapping relationship between the first-type configuration indexes and the second-type configuration indexes includes: determining the mapping relationship between the first-type configuration indexes and the second-type configuration indexes according to the received signaling. That is, the mapping relationship between the first-type configuration indexes and the second-type configuration indexes is indicated in the signaling.

In an embodiment, the mapping relationship between the first-type configuration indexes and the second-type configuration indexes is determined, where the first-type configuration indexes are configurations of a CORESET0 that a low configuration UE (that is, the first-type terminal) cannot support, and the second-type configuration indexes are configurations of the CORESET0 that the low configuration UE can support. For example, the configuration of the CORESET0 that the first-type terminal cannot support includes one of the following: a bandwidth of the CORESET0 is greater than a bandwidth capability of the first-type terminal, a frequency domain position of the CORESET0 is not applicable to the first-type terminal, the number of symbols in the CORESET0 is not supported by the first-type terminal, a multiplexing manner between an SSB and the CORESET0 is not supported by the first-type terminal, or the like.

For example, in a configuration set shown in Table 2, indexes 6-14 belong to the first-type configuration indexes, indexes 0-5 belong to the second-type configuration indexes, and an index 15 is a reserved configuration index.

The predefined mapping relationship is that each configuration index of the first-type configuration indexes corresponds to a first configuration index of the second-type configuration indexes. The predefined mapping relationship may be a mapping rule specified in a protocol or may be a mapping relationship indicated by the first communication node to the first-type terminal via the signaling. The mapping relationship is defined so that a configuration index belonging to the first-type configuration indexes can be uniquely mapped to a certain configuration index of the second-type configuration indexes. Any other mapping relationship is supported.

When a CORESET0 configuration index configured and delivered by a network side through a PBCH belongs to the first-type configuration indexes, for example, an index 8, the low configuration terminal determines, according to the predefined mapping relationship between the second-type configuration indexes and the first-type configuration indexes, that a current CORESET0 configuration index corresponding to the configured CORESET0 configuration index is an index 0. In this manner, the second-type terminal with a conventional capability still understands the CORESET0 configuration as the index 8 so that both the first-type terminal and the second-type terminal detect a Type0 PDCCH on corresponding time and frequency resources according to their respective understandings and access a cell under the same first communication node. When the first-type terminal adopts another indication table of configuration parameters of the CORESET0, the mapping relationship between the first-type configuration indexes and the second-type configuration indexes may also be established in the manner in the preceding embodiment so that the first-type terminal has a new understanding of the control resource set configuration information.

In an embodiment, since the bandwidth of the CORESET0 for the first-type terminal is reduced, the number of symbols in the CORESET0 may be correspondingly increased, so as to ensure that the first-type terminal can support the same PDCCH aggregation level as the second-type terminal. In an embodiment, that the corresponding second configuration information is determined according to the predefined conversion rule and the first configuration information further includes: adjusting the number of symbols in a control resource set in the control resource set configuration information.

In an embodiment, the step of adjusting the number of symbols in the control resource set in the control resource set configuration information includes: determining the number of symbols in a control resource set corresponding to the first-type terminal according to the number of resource blocks (RBs) in a control resource set in the first configuration information, the number of RBs in a control resource set in the second configuration information and the number of symbols in the control resource set in the first configuration information.

In an embodiment, the step of determining the number of symbols in the control resource set corresponding to the second communication node according to the number of RBs in the control resource set in the first configuration information, the number of RBs in the control resource set in the second configuration information and the number of symbols in the control resource set in the first configuration information includes that the number of symbols in the control resource set corresponding to the second communication node is a product of a first RB ratio and the number of symbols in the control resource set in the first configuration information, where the first RB ratio is a ratio of the number of RBs in the control resource set in the first configuration information to the number of RBs in the control resource set in the second configuration information.

In an embodiment, the step of determining the number of symbols in the control resource set corresponding to the second communication node according to the number of RBs in the control resource set in the first configuration information, the number of RBs in the control resource set in the second configuration information and the number of symbols in the control resource set in the first configuration information includes that the number of symbols in the control resource set corresponding to the second communication node is a larger value between the number of symbols in the control resource set in the second configuration information and the product of the first RB ratio and the number of symbols in the control resource set in the first configuration information, where the first RB ratio is the ratio of the number of RBs in the control resource set in the first configuration information to the number of RBs in the control resource set in the second configuration information.

For example, the bandwidth of the CORESET0 for the second-type terminal is configured to be 48 RBs. After a configuration conversion (from the index 8 to the index 0) is performed according to the mapping relationship defined above, the bandwidth of the CORESET0 for the first-type terminal is 24 RBs, that is, the bandwidth of the CORESET0 for the first-type terminal is ½ of a configuration with the index 8. In this case, the number of symbols in the CORESET0 may be twice the number of symbols in an original configuration and a value of $N_{symb}^{CORESET}$ in the index 0 is ignored, that is, the number of symbols in the CORESET0 for the first-type terminal is determined to be 4. That is, the number of symbols in the CORESET0 for the first-type terminal is defined as (original configuration $N_{RB}^{CORESET}$/new configuration $N_{RB}^{CORESET}$)×original configuration $N_{symb}^{CORESET}$. The 'original configuration' refers to a configuration indicated in the PBCH (the configuration corresponding to the index 8 in this embodiment), that is, the control resource set in the first configuration information. The 'new configuration' refers to a configuration after the configuration conversion according to the mapping relationship (the configuration corresponding to the index 0 in this embodiment), that is, the control resource set in the second configuration information.

Alternatively, the number of symbols in the CORESET0 for the first-type terminal may also be defined as max{(original configuration $N_{RB}^{CORESET}$/new configuration $N_{RB}^{CORESET}$)×original configuration $N_{symb}^{CORESET}$, new configuration $N_{symb}^{CORESET}$}. The 'original configuration' refers to the configuration indicated in the PBCH (the configuration corresponding to the index 8 in this embodiment), that is, the control resource set in the first configuration information. The 'new configuration' refers to the configuration after the configuration conversion according to the mapping relationship (the configuration corresponding to the index 0 in this embodiment), that is, the control resource set in the second configuration information.

In an embodiment, a CORESET defines a size of time and frequency resource blocks on which a UE detects a PDCCH and a frequency domain position at which the UE detects the PDCCH, and a time domain position at which the PDCCH is detected (also referred to as a monitoring occasion (MO)) is indicated by the search space configuration information. A search space of the Type0 PDCCH is also referred to as a search space 0 (SS0). The SS0 is indicated by a 4-bit indicator field SS0 in the PBCH. Table 3 is illustrative of an indication of the search space 0. As shown in Table 3, 4 bits are used for indicating indexes 0-15, and a different index corresponds to a search space configuration, where O and M are parameters used for calculating an index of a slot at which the monitoring occasion is located. In Table 3, the number of search spaces in the slot and a starting symbol index are jointly indicated.

TABLE 3

Indication information of the search space 0

| Index | O | Number of Search Spaces in Each Slot | M | Starting Symbol Index |
|---|---|---|---|---|
| 0 | 0 | 1 | 1 | 0 |
| 1 | 0 | 2 | 1/2 | {0, if i is even, {$N_{symb}^{CORESET}$, if i is odd} |
| 2 | 2 | 1 | 1 | 0 |
| 3 | 2 | 2 | 1/2 | {0, if i is even, {$N_{symb}^{CORESET}$, if i is odd} |
| 4 | 5 | 1 | 1 | 0 |
| 5 | 5 | 2 | 1/2 | {0, if i is even, {$N_{symb}^{CORESET}$, if i is odd} |
| 6 | 7 | 1 | 1 | 0 |
| 7 | 7 | 2 | 1/2 | {0, if i is even, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

For the same search space indication information, that is, the same SS0 configuration, an understanding different from that of the second-type terminal is defined for the first-type terminal.

In an embodiment, in the case where the second configuration information is the search space configuration information, the first configuration information is the search space configuration information. That the corresponding second configuration information is determined according to the predefined conversion rule and the first configuration information includes the following:

A slot position where a first physical downlink control channel (PDCCH) is monitored by the second communication node is determined according to the first configuration information. Alternatively, a starting symbol index of a monitoring occasion of the second communication node is determined according to a starting symbol index of a monitoring occasion of the second-type terminal in the first configuration information.

In an embodiment, that the slot position where the first PDCCH is monitored by the second communication node is determined according to the first configuration information includes the following.

A slot index corresponding to the second communication node is calculated according to the first configuration information, where the slot index is an index, in a radio frame, of a slot where a monitoring occasion of the PDCCH corresponding to the second communication node is located.

In an embodiment, the slot index is calculated according to the following formula:

$$n_0 = (O \cdot 2^\mu + \text{offset1} + \lfloor i \cdot M \rfloor) \bmod N_{slot}^{frame,\mu};$$

where $\lfloor \ \rfloor$ denotes a floor operation, O denotes a first parameter, M denotes a second parameter, offset1 denotes a first preset offset related to $N_{slot}^{frame,\mu}$ denotes the number of slots included in the radio frame, i denotes an index of a synchronization signal block, $\mu$ and a subcarrier spacing satisfy a predefined correspondence relationship (shown in Table 4), and values of the first parameter and the second parameter are acquired from the first configuration information. Table 4 is a mapping table between p and the subcarrier spacing according to an embodiment of the present application.

TABLE 4

Mapping table between $\mu$ and the subcarrier spacing

| $\mu$ | SCS $\Delta f = 2^\mu \cdot 15$[kHz] |
| --- | --- |
| 0 | 15 |
| 1 | 30 |
| 2 | 60 |
| 3 | 120 |
| 4 | 240 |
| 5 | 480 |
| 6 | 960 |
| 7 | 1920 |
| 8 | 3840 |

In an embodiment, under a multiplexing Pattern1, the second-type terminal may calculate the index, in the radio frame, of the slot where the monitoring occasion of the Type0 PDCCH is located by using the formula $n_0 = (O \cdot 2^\mu \lfloor i \cdot M \rfloor) \bmod N_{slot}^{frame,\mu}$ and monitors the Type0 PDCCH within two consecutive slots starting from no. The values of the first parameter O and the second parameter M are indicated by the indicator field SS0, and i is the index of the synchronization signal block (that is, SSB index).

For the first-type terminal, the first preset offset (that is, offset1) is additionally introduced so as to adjust the slot position where the Type0 PDCCH is monitored by the first-type terminal, thereby avoiding a conflict of PDCCHs of the two types of UE (the first-type terminal and the second-type terminal). The index, in the radio frame, of the slot where the monitoring occasion of the Type0 PDCCH is located is calculated by using the formula $n_0 = (O \cdot 2^\mu \lfloor i \cdot M \rfloor) \bmod N_{slot}^{frame,\mu}$. The first preset offset offset1 is related to the value of the second parameter M. For example, Table 5 is a mapping relationship table between the second parameter and the first preset offset. As shown in Table 5, the second parameter and the first preset offset have a one-to-one correspondence. $L_{max}$ in Table 5 denotes a maximum number of SSBs.

TABLE 5

Mapping relationship table between the second parameter and the first preset offset

| Second Parameter | First Preset Offset |
| --- | --- |
| 1/2 | $L_{max}/2 + 1$ |
| 1 | $L_{max} + 1$ |
| 2 | $2L_{max} + 1$ |

In an embodiment, that the starting symbol index of the monitoring occasion of the second communication node is determined according to the starting symbol index of the monitoring occasion of the second-type terminal in the first configuration information includes steps described below.

A starting symbol index in the first configuration information is used as the starting symbol index of the monitoring occasion of the second-type terminal.

The starting symbol index of the monitoring occasion of the second-type terminal is moved backward by a second preset offset so that the starting symbol index of the monitoring occasion of the second communication node is obtained, where a value of the second preset offset is related to at least one of: the number of search spaces included in one slot or whether two search spaces included in one slot are consecutive.

In an embodiment, under the multiplexing Pattern1, the second-type terminal determines the starting symbol index of the monitoring occasion according to a starting symbol index indicated in the SS0; and the first-type terminal may move the indicated starting symbol index backward by the second preset offset denoted as offset2. For example, the second preset offset may be $N_{symb}^{CORESET}$ and/or $2 \times N_{symb}^{CORESET}$.

In an embodiment, in the case where one slot includes one search space or in the case where one slot includes two search spaces and the two search spaces are non-consecutive, the second preset offset is the number of symbols in a control resource set corresponding to the second-type terminal.

Figure 4:
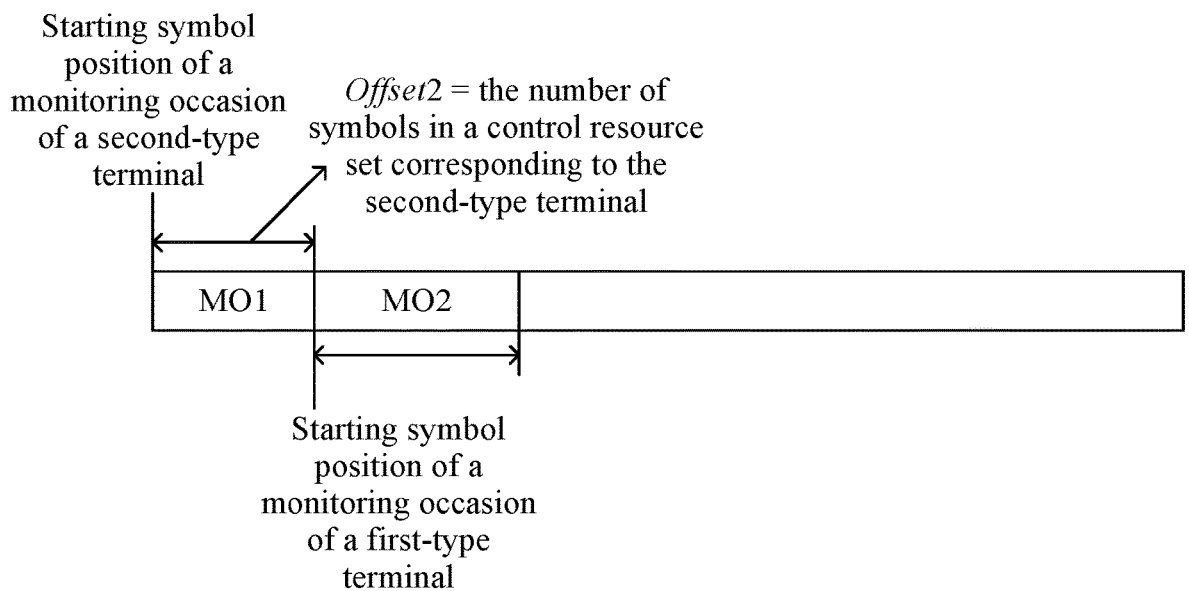
FIG. 4 is a schematic diagram of a configuration of starting symbol positions of a first-type terminal and a second-type terminal according to an embodiment of the present application.

FIG. 4 is a schematic diagram of a configuration of starting symbol positions of a first-type terminal and a second-type terminal according to an embodiment of the present application. As shown in FIG. 4, in the case where one slot includes one search space, a difference between a starting symbol position of the monitoring occasion of the first-type terminal and a starting symbol position of the monitoring occasion of the second-type terminal is the second preset offset, that is, offset2. MO1 denotes the monitoring occasion of the second-type terminal and MO2 denotes the monitoring occasion of the first-type terminal. In this case, the second preset offset offset2 is $N_{symb}^{CORESET}$, where $N_{symb}^{CORESET}$ denotes the number of symbols in the CORESET for the second-type terminal.

Figure 5:
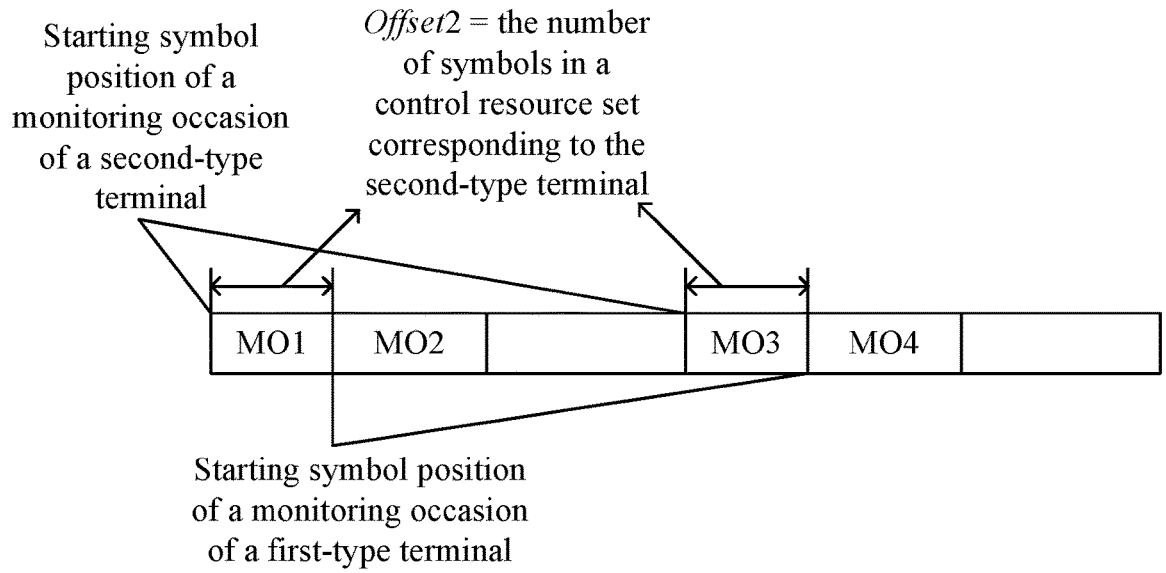
FIG. 5 is a schematic diagram of another configuration of starting symbol positions of a first-type terminal and a second-type terminal according to an embodiment of the present application.

FIG. 5 is a schematic diagram of another configuration of starting symbol positions of a first-type terminal and a second-type terminal according to an embodiment of the present application. As shown in FIG. 5, in the case where one slot includes two search spaces and the two search spaces are non-consecutive, the difference between the starting symbol position of the monitoring occasion of the first-type terminal and the starting symbol position of the monitoring occasion of the second-type terminal is the second preset offset, that is, offset2. MO1 and MO3 denote the monitoring occasions of the second-type terminal, MO2 and MO4 denote the monitoring occasions of the first-type terminal, and the second preset offset offset2 is $N_{symb}^{CORESET}$, that is, an offset between a starting symbol of MO2 and a starting symbol of MO1 is $N_{symb}^{CORESET}$, and an offset between a starting symbol of MO4 and a starting symbol of MO3 is $N_{symb}^{CORESET}$. $N_{symb}^{CORESET}$ denotes the number of symbols in the CORESET for the second-type terminal.

In an embodiment, in the case where one slot includes two search spaces and the two search spaces are consecutive, the second preset offset is twice the number of symbols in the control resource set corresponding to the second-type terminal or a sum of the number of symbols in the control resource set corresponding to the second-type terminal and the number of symbols in the control resource set corresponding to the second communication node.

Figure 6:
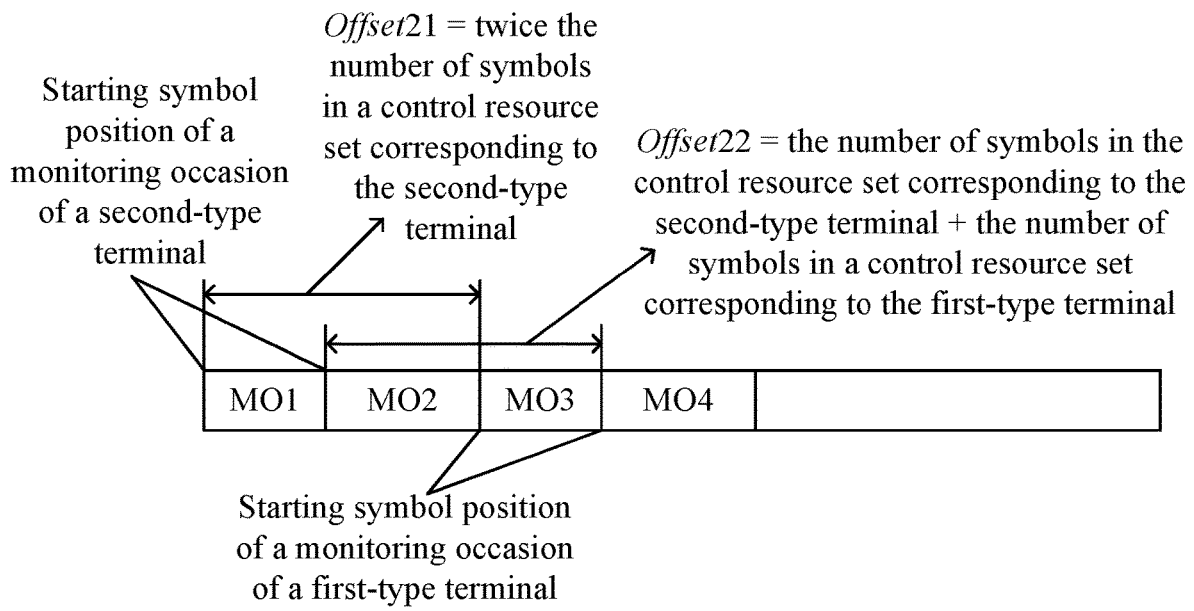
FIG. 6 is a schematic diagram of another configuration of starting symbol positions of a first-type terminal and a second-type terminal according to an embodiment of the present application.

FIG. 6 is a schematic diagram of another configuration of starting symbol positions of a first-type terminal and a second-type terminal according to an embodiment of the present application. As shown in FIG. 6, MO1 and MO2 denote the monitoring occasions of the second-type terminal, and MO3 and MO4 denote the monitoring occasions of the first-type terminal. In the case where one slot includes two search spaces and the two search spaces are consecutive, an offset between a starting symbol of MO3 and a starting symbol of MO1 is denoted as offset21, that is, offset21 is $2 \times N_{symb}^{CORESET}$, and an offset between a starting symbol of MO4 and a starting symbol of MO2 is denoted as offset22, that is, offset22 is $N_{symb}^{CORESET} + N'_{symb}^{CORESET}$. $N_{symb}^{CORESET}$ denotes the number of symbols in the CORESET for the second-type terminal, and $N'_{symb}^{CORESET}$ denotes the number of symbols in the CORESET for the first-type terminal.

In an embodiment, in the case where the second configuration information is the DMRS configuration information, the first configuration information is the DMRS configuration information. That the corresponding second configuration information is determined according to the predefined conversion rule and the first configuration information includes the following:

A frequency domain position of a subcarrier 0 in a lowest RB in the control resource set corresponding to the second-type terminal is configured. With the frequency domain position of the subcarrier 0 as a reference point, a DMRS sequence of the first PDCCH corresponding to the second communication node is mapped.

Figure 7:
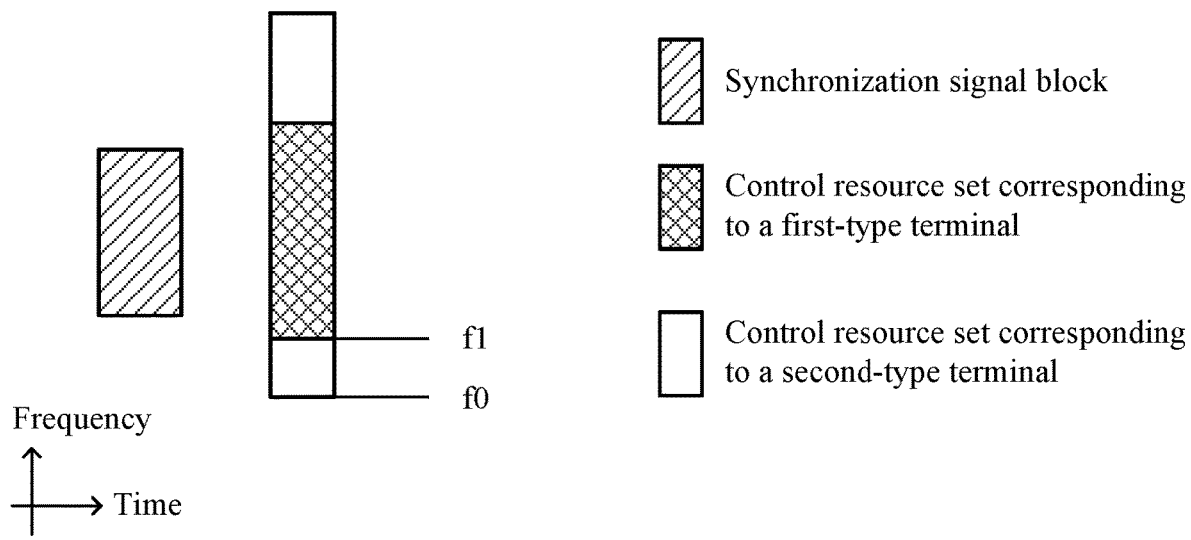
FIG. 7 is a schematic diagram of a time and frequency resource relationship between a control resource set 0 and a synchronization signal block according to an embodiment of the present application.

In an embodiment, the corresponding PDCCH DMRS is determined by using the first-type terminal. FIG. 7 is a schematic diagram of a time and frequency resource relationship between a control resource set 0 and a synchronization signal block according to an embodiment of the present application. As shown in FIG. 7, in the case where the CORESETs for the first-type terminal and the second-type terminal are configured on overlapping time and frequency resources, a bandwidth range of the CORESET for the second-type terminal (for example, CORESET0, that is, a CORESET configuration indicated by the PBCH) includes a frequency domain range of the CORESET for the first-type terminal (which is denoted as CORESET0'). CORESET0' may be a CORESET0 configured according to the PBCH and a CORESET configuration obtained according to the defined mapping relationship between configuration indexes in the preceding embodiment. The subcarrier 0 in the lowest RB in the CORESET0' is f1, and the subcarrier 0 in the lowest RB in the CORESET0 is f0. A physical downlink shared channel (PDSCH) is scheduled by the Type0 PDCCH of the first-type terminal within a bandwidth range of the CORESET0'. The PDSCH is scheduled by the Type0 PDCCH of the second-type terminal within the bandwidth range of the CORESET0.

The first-type terminal generates a PDCCH DMRS sequence in a predefined manner and maps the DMRS sequence on a resource corresponding to the PDCCH with f0 as the reference point.

In an embodiment, in the case where the first PDCCH sent to the second communication node uses the same aggregation level as a second PDCCH sent to the second-type terminal, the second communication node and the second-type terminal share control information and a DMRS on an overlapping resource. The first PDCCH and the second PDCCH are both Type0 PDCCHs, but the first PDCCH and the second PDCCH have different parameters such as time and frequency resources and code rates, that is, the first PDCCH and the second PDCCH are independent. In an embodiment, in the case where the Type0 PDCCH sent to the first-type terminal (that is, the first PDCCH) uses the same aggregation level as the Type0 PDCCH sent to the second-type terminal (that is, the second PDCCH), the two types of UE (that is, the first-type terminal and the second-type terminal) may share the control information and the DMRS on the overlapping resource. For example, time and frequency resources occupied by the Type0 PDCCH of the first-type terminal are control channel element (CCE) 1, CCE2, CCE5 and CCE6 and time and frequency resources occupied by the Type0 PDCCH of the second-type terminal are CCE3, CCE4, CCE5 and CCE6; then, the control information mapped on CCE5 and CCE6 and the DMRS mapped on the corresponding resources may be shared by the two types of UE.

When the Type0 PDCCH sent to the first-type terminal (that is, the first PDCCH) and the Type0 PDCCH sent to the second-type terminal (that is, the second PDCCH) use different aggregation levels, the base station should prevent the two Type0 PDCCHs from occupying the same CCE.

In an embodiment, the access indication information field is used for indicating whether the current cell supports access of the second communication node or indicating a protocol version supported by the current cell.

The access indication information field is defined in the system information (such as an SIB1) for indicating whether the current cell supports the access of the first-type terminal or indicating the protocol version supported by the current cell. The access indication information field is included in the Type0 PDCCH or the PDSCH scheduled by the Type0 PDCCH and may be a 1-bit signaling overhead. For example, 1 indicates that the access of the first-type terminal is supported, and 0 indicates that the access of the first-type terminal is not supported. Alternatively, the existence or non-existence of the access indication information field is used for implicitly indicating whether the access of the first-type terminal is supported. For example, the existence indicates that the access of the first-type terminal is supported, and the non-existence indicates that the access of the first-type terminal is not supported.

The first-type terminal receives the SSB and detects the Type0 PDCCH according to a Type0 PDCCH detection configuration (including a CORESET configuration and a search space configuration) configured in the PBCH by one of two manners described below.

In a first manner, the capability of the first-type terminal supports the Type0 PDCCH to be monitored within the configured CORESET. For example, in Table 2, the indexes 0-5 represent the configurations that the first-type terminal can support, and the first-type terminal receives the Type0 PDCCH according to configuration information. When the access indication information field is included in the Type0 PDCCH, whether the access of the first-type terminal is allowed is determined according to an indicator field. When the access indication information field is included in the PDSCH, the first-type terminal receives the PDSCH according to scheduling information in the PDCCH and then determines whether the current cell allows the access of the first-type terminal. If the access of the first-type terminal is allowed, the first-type terminal performs uplink synchronization and accesses the network. If the access of the first-type terminal is not allowed, the first-type terminal abandons the access.

In a second manner, the capability of the first-type terminal does not support the Type0 PDCCH to be monitored within the configured CORESET. For example, in Table 2, the indexes 6-14 represent the configurations that the first-type terminal cannot support, and the first-type terminal re-interprets the CORESET configuration information according to the mapping relationship between configuration indexes and control resource set configurations in the preceding embodiment and receives the Type0 PDCCH according to the re-interpreted configuration. If the Type0 PDCCH is successfully detected, it indicates that the current cell allows the access of the first-type terminal. If the Type0 PDCCH cannot be successfully detected (or if the Type0 PDCCH still fails to be detected after multiple attempts), the access to the current cell is abandoned.

In an embodiment, in the case where the second configuration information is the cellbarred indicator field in the MIB information, the first configuration information is the cellbarred indicator field in the MIB information. That the corresponding second configuration information is determined according to the predefined conversion rule and the first configuration information includes: redefining an understanding of a value of the cellbarred indicator field by the second communication node.

In an embodiment, the second configuration information is a reinterpretation of the cellbarred indicator field in the MIB information. In an embodiment, the step of redefining the understanding of the value of the cellbarred indicator field by the second communication node includes the following.

In the case where the value of the cellbarred indicator field is barred or notbarred, the second communication node is not restricted to access the current cell.

In an embodiment, the information indication method further includes: determining, according to an information indicator field, whether the current cell allows the access of the second communication node.

In an embodiment, the PBCH is carried in the MIB information and includes the cellbarred indicator field for restricting the conventional terminal (that is, the second-type terminal) to access the current cell. For example, in the case where the cellbarred is barred, the terminal is restricted to access the cell; in the case where the cellbarred is notbarred, the terminal is allowed to access the cell.

The understanding of the value of the cellbarred indicator field by the first-type terminal is redefined, that is, the first-type terminal is not restricted to access the cell no matter whether the value of the cellbarred indicator field is barred or notbarred.

In an embodiment, if the configured CORESET is supported by the first-type terminal (for example, the first-type terminal having a bandwidth capability of 5 MHz supports CORESET configuration indexes 0-5 in Table 2), the first-type terminal receives the Type0 PDCCH according to the configuration information and receives the PDSCH according to the scheduling information in the PDCCH no matter whether the value of the cellbarred is notbarred or barred.

In an embodiment, the first-type terminal may determine, according to the access indication information provided in the preceding embodiment, whether the current cell allows the access of the first-type terminal. If the access of the first-type terminal is allowed, the first-type terminal performs the uplink synchronization and accesses the network. If the access of the first-type terminal is not allowed, the first-type terminal abandons the access.

In an embodiment, the configured CORESET is not supported by the first-type terminal (for example, the first-type terminal having a bandwidth capability of 5 MHz cannot support CORESET configuration indexes 6-14 in Table 2).

When cellbarred=notbarred, the first-type terminal re-interprets the CORESET configuration information/CORESET configuration in the manner provided in the preceding embodiment, re-interprets the search space configuration in the manner provided in the preceding embodiment, and receives the Type0 PDCCH according to the re-interpreted configurations. If the Type0 PDCCH is successfully detected, it indicates that the current cell allows the access of the first-type terminal. If the Type0 PDCCH cannot be successfully detected (or if the Type0 PDCCH still fails to be detected after multiple attempts), the access to the current cell is abandoned.

When cellbarred=barred, the first-type terminal re-interprets the CORESET configuration information/CORESET configuration in the manner provided in the preceding embodiment and receives the Type0 PDCCH according to the re-interpreted configuration. If the Type0 PDCCH is successfully detected, it indicates that the current cell allows the access of the first-type terminal. If the Type0 PDCCH cannot be successfully detected (or if the Type0 PDCCH still fails to be detected after multiple attempts), the access to the current cell is abandoned. In this embodiment, the second-type terminal is prevented from accessing the cell, and the network side does not send the Type0 PDCCH to the second-type terminal so that there is no conflict between the Type0 PDCCHs of the two types of UE. Therefore, the first-type terminal may follow the search space configuration in the PBCH without re-interpretation.

Figure 8:
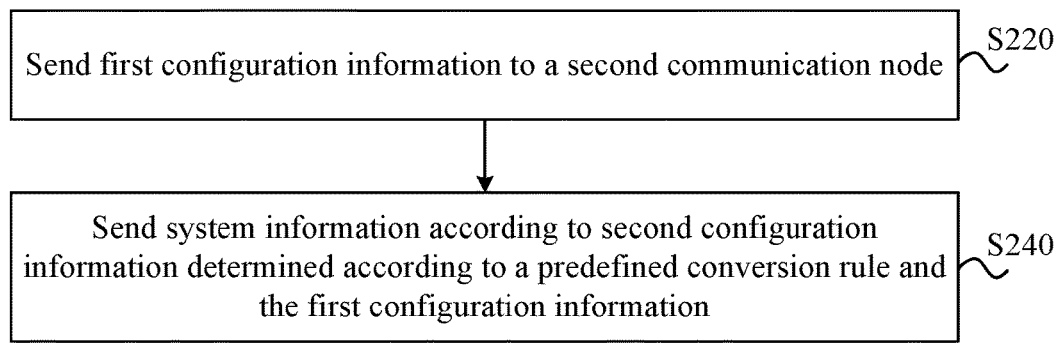
FIG. 8 is a flowchart of another information indication method according to an embodiment of the present application.

FIG. 8 is a flowchart of another information indication method according to an embodiment of the present application. This embodiment is performed by a first communication node. The first communication node may be a base station. As shown in FIG. 8, this embodiment includes S220 and S240.

In S220, first configuration information is sent to a second communication node.

In S240, system information is sent according to second configuration information determined according to a predefined conversion rule and the first configuration information, where each of the first configuration information and the second configuration information includes at least one of control resource set configuration information, search space configuration information, DMRS configuration information or a cellbarred indicator field in MIB information.

In an embodiment, the system information includes access indication information. In an embodiment, the first configuration information is original configuration information corresponding to a first-type terminal, and the second configuration information is new configuration information corresponding to the first-type terminal. The base station sends the original configuration information to the first-type terminal and sends the next system information to the first-type terminal according to the obtained new configuration information so that the first-type terminal accesses a current cell according to the access indication information in the system information.

Figure 9:
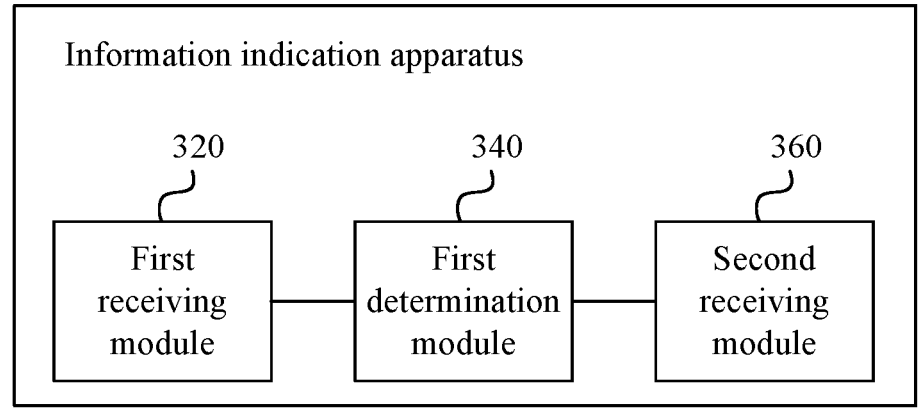
FIG. 9 is a block diagram of an information indication apparatus according to an embodiment of the present application.

FIG. 9 is a block diagram of an information indication apparatus according to an embodiment of the present application. This embodiment is performed by a second communication node. The second communication node is a first-type terminal, that is, a low configuration terminal that cannot support a bandwidth capability to be supported by a conventional terminal.

As shown in FIG. 9, the information indication apparatus in this embodiment includes a first receiving module 320, a first determination module 340 and a second receiving module 360.

The first receiving module 320 is configured to receive first configuration information sent by a first communication node. The first determination module 340 is configured to determine corresponding second configuration information according to a predefined conversion rule and the first configuration information, where each of the first configuration information and the second configuration information includes one of control resource set configuration information, search space configuration information, DMRS configuration information or a cellbarred indicator field in MIB information. The second receiving module 360 is configured to receive system information according to an indication of the second configuration information.

The information indication apparatus provided in this embodiment is configured to perform the information indication method in the embodiment shown in FIG. 3. The information indication apparatus provided in this embodiment has similar implementation principles and technical effects which are not repeated here.

In an embodiment, the system information includes access indication information.

In an embodiment, in the case where the second configuration information is the control resource set configuration information, the first configuration information is the control resource set configuration information; and the first determination module includes a first determination unit, a second determination unit and a third determination unit.

The first determination unit is configured to determine a mapping relationship between first-type configuration indexes and second-type configuration indexes, where the first-type configuration indexes correspond to control resource set configuration information that the first-type terminal cannot support, and the second-type configuration indexes correspond to control resource set configuration information that the first-type terminal can support. The second determination unit is configured to: in the case where a configuration index corresponding to the first configuration information belongs to the first-type configuration indexes, determine a corresponding configuration index of the second-type configuration indexes according to the mapping relationship. The third determination unit is configured to use configuration information of the corresponding configuration index of the second-type configuration indexes as the second configuration information.

In an embodiment, the first determination unit determines the mapping relationship between the first-type configuration indexes and the second-type configuration indexes in one of manners described below.

The mapping relationship between the first-type configuration indexes and the second-type configuration indexes is determined according to a preset mapping rule. The mapping relationship between the first-type configuration indexes and the second-type configuration indexes is predefined. The mapping relationship between the first-type configuration indexes and the second-type configuration indexes is determined according to received signaling.

In an embodiment, the first determination module further includes an adjustment unit.

The adjustment unit is configured to adjust the number of symbols in a control resource set in the control resource set configuration information.

In an embodiment, the adjustment unit is configured to determine the number of symbols in a control resource set corresponding to the second communication node according to the number of RBs in a control resource set in the first configuration information, the number of RBs in a control resource set in the second configuration information and the number of symbols in the control resource set in the first configuration information.

In an embodiment, the adjustment unit determines the number of symbols in the control resource set corresponding to the second communication node according to the number of RBs in the control resource set in the first configuration information, the number of RBs in the control resource set in the second configuration information and the number of symbols in the control resource set in the first configuration information in a manner described below.

The number of symbols in the control resource set corresponding to the second communication node is a product of a first RB ratio and the number of symbols in the control resource set in the first configuration information, where the first RB ratio is a ratio of the number of RBs in the control resource set in the first configuration information to the number of RBs in the control resource set in the second configuration information.

In an embodiment, the adjustment unit determines the number of symbols in the control resource set corresponding to the second communication node according to the number of RBs in the control resource set in the first configuration information, the number of RBs in the control resource set in the second configuration information and the number of symbols in the control resource set in the first configuration information in a manner described below.

The number of symbols in the control resource set corresponding to the second communication node is a larger value between the number of symbols in the control resource set in the second configuration information and the product of the first RB ratio and the number of symbols in the control resource set in the first configuration information, where the first RB ratio is the ratio of the number of RBs in the control resource set in the first configuration information to the number of RBs in the control resource set in the second configuration information.

In an embodiment, in the case where the second configuration information is the search space configuration information, the first configuration information is the search space configuration information.

The first determination module is configured to determine a slot position where a first PDCCH is monitored by the second communication node according to the first configuration information or determine a starting symbol index of a monitoring occasion of the second communication node according to a starting symbol index of a monitoring occasion of a second-type terminal in the first configuration information.

In an embodiment, the first determination module determines the slot position where the first PDCCH is monitored by the second communication node according to the first configuration information in a manner described below.

A slot index corresponding to the second communication node is calculated according to the first configuration information, where the slot index is an index, in a radio frame, of a slot where a monitoring occasion of the PDCCH corresponding to the second communication node is located.

In an embodiment, the slot index is calculated according to the following formula:

$$n_0 = (O \cdot 2^\mu + \text{offset1} + \lfloor i \cdot M \rfloor) \bmod N_{slot}^{frame,\mu};$$

where $\lfloor \ \rfloor$ denotes a floor operation, O denotes a first parameter, M denotes a second parameter, offset1 denotes a first preset offset related to M, $N_{slot}^{frame,\mu}$ denotes the number of slots included in the radio frame, i denotes an index of a synchronization signal block, $\mu$ and a subcarrier spacing satisfy a predefined correspondence relationship, and values of the first parameter and the second parameter are acquired from the first configuration information.

In an embodiment, the first determination module determines the starting symbol index of the monitoring occasion of the second communication node according to the starting symbol index of the monitoring occasion of the second-type terminal in the first configuration information in a manner described below.

A starting symbol index in the first configuration information is used as the starting symbol index of the monitoring occasion of the second-type terminal. The starting symbol index of the monitoring occasion of the second-type terminal is moved backward by a second preset offset so that the starting symbol index of the monitoring occasion of the second communication node is obtained, where a value of the second preset offset is related to at least one of: the number of search spaces included in one slot or whether two search spaces included in one slot are consecutive.

In an embodiment, in the case where one slot includes one search space or in the case where one slot includes two search spaces and the two search spaces are non-consecutive, the second preset offset is the number of symbols in a control resource set corresponding to the second-type terminal.

In an embodiment, in the case where one slot includes two search spaces and the two search spaces are consecutive, the second preset offset is twice the number of symbols in the control resource set corresponding to the second-type terminal or a sum of the number of symbols in the control resource set corresponding to the second-type terminal and the number of symbols in the control resource set corresponding to the second communication node.

In an embodiment, in the case where the second configuration information is the DMRS configuration information, the first configuration information is the DMRS configuration information; and the first determination module includes a configuration unit and a fourth determination unit.

The configuration unit is configured to configure a frequency domain position of a subcarrier 0 in a lowest RB in the control resource set corresponding to the second-type terminal. The fourth determination unit is configured to: with the frequency domain position of the subcarrier 0 as a reference point, map a DMRS sequence of the first PDCCH corresponding to the second communication node.

In an embodiment, in the case where the first PDCCH sent to the second communication node uses the same aggregation level as a second PDCCH sent to the second-type terminal, the second communication node and the second-type terminal share control information and a DMRS on an overlapping resource.

In an embodiment, an access indication information field is used for indicating whether a current cell supports access of the second communication node or indicating a protocol version supported by the current cell.

In an embodiment, in the case where the second configuration information is the cellbarred indicator field in the MIB information, the first configuration information is the cellbarred indicator field in the MIB information; and the first determination module is configured to redefine an understanding of a value of the cellbarred indicator field by the second communication node.

In an embodiment, the first determination module redefines the understanding of the value of the cellbarred indicator field by the second communication node in the following manner: in the case where the value of the cellbarred indicator field is barred or notbarred, the second communication node is not restricted to access the current cell.

In an embodiment, the information indication apparatus further includes a second determination module configured to determine, according to an information indicator field, whether the current cell allows the access of the second communication node.

Figure 10:
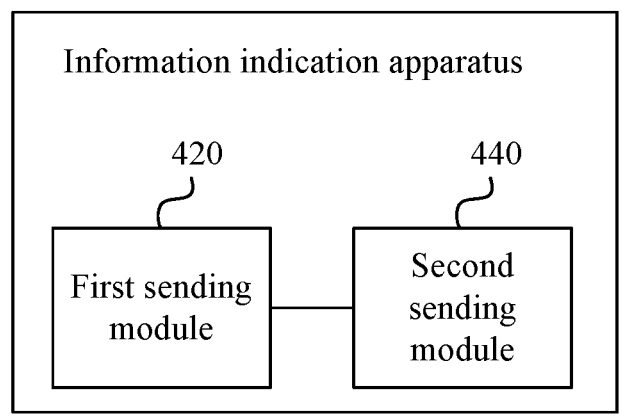
FIG. 10 is a block diagram of another information indication apparatus according to an embodiment of the present application.

FIG. 10 is a block diagram of another information indication apparatus according to an embodiment of the present application. This embodiment is performed by a first communication node. The first communication node may be a base station. As shown in FIG. 10, the information indication apparatus in this embodiment includes a first sending module 420 and a second sending module 440.

The first sending module is configured to send first configuration information to a second communication node. The second sending module is configured to send system information according to an indication of second configuration information determined according to a predefined conversion rule and the first configuration information, where each of the first configuration information and the second configuration information includes at least one of control resource set configuration information, search space configuration information, DMRS configuration information or a cellbarred indicator field in MIB information.

The information indication apparatus provided in this embodiment is configured to perform the information indication method in the embodiment shown in FIG. 8. The information indication apparatus provided in this embodiment has similar implementation principles and technical effects which are not repeated here.

In an embodiment, the system information includes access indication information.

Figure 11:
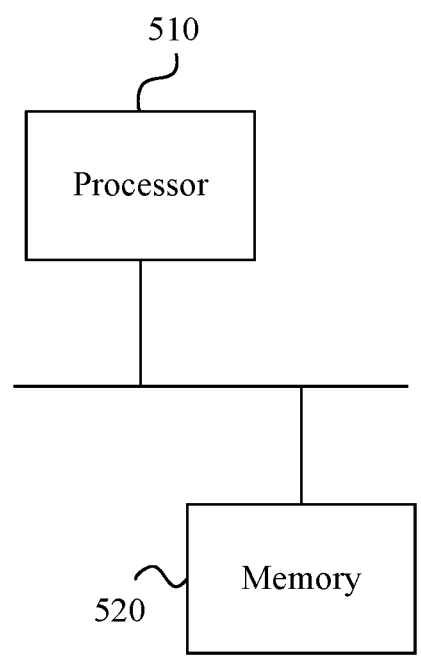
FIG. 11 is a structural diagram of a device according to an embodiment of the present application.

FIG. 11 is a structural diagram of a device according to an embodiment of the present application. As shown in FIG. 11, the device provided by the present application includes a processor 510 and a memory 520. One or more processors 510 may be disposed in the device. FIG. 11 shows one processor 510 as an example. One or more memories 520 may be disposed in the device. FIG. 11 shows one memory 520 as an example. The processor 510 and the memory 520 in the device may be connected by a bus or in other manners. FIG. 11 shows a connection by the bus as an example. In this embodiment, the device is a second communication node.

As a computer-readable storage medium, the memory 520 may be configured to store software programs, computer-executable programs and modules, such as program instructions/modules (for example, the first receiving module, the first determination module and the second receiving module in the information indication apparatus) corresponding to the device according to any embodiment of the present application. The memory 520 may include a program storage region and a data storage region, where the program storage region may store an operating system and an application program required by at least one function, and the data storage region may store data created depending on the use of the device. Additionally, the memory 520 may include a high-speed random-access memory and may also include a nonvolatile memory such as at least one disk memory, a flash memory or another nonvolatile solid-state memory. In some examples, the memory 520 may include memories which are remotely disposed relative to the processor 510, and these remote memories may be connected to the device via a network. Examples of the preceding network include, but are not limited to, the Internet, an intranet, a local area network, a mobile communication network and a combination thereof.

The preceding device may be configured to perform the information indication method applied to the second communication node and provided in any preceding embodiment and has corresponding functions and effects.

When the device is a first communication node, the programs stored in the memory 520 may be program instructions/modules corresponding to the information indication method applied to the first communication node and provided in embodiments of the present application. The processor 510 executes software programs, instructions and modules stored in the memory 520 to perform one or more function applications and data processing of a computer device, that is, to implement the information indication method applied to the first communication node in the preceding method embodiment. When the preceding device is the first communication node, the device may perform the information indication method applied to the first communication node and provided in any embodiment of the present application and has corresponding functions and effects.

Embodiments of the present application further provide a storage medium including a computer-executable instruction, where the computer-executable instruction, when executed by a computer processor, is used for performing an information indication method applied to a second communication node. The method includes: receiving first configuration information sent by a first communication node; determining corresponding second configuration information according to a predefined conversion rule and the first configuration information, where each of the first configuration information and the second configuration information includes at least one of control resource set configuration information, search space configuration information, DMRS configuration information or a cellbarred indicator field in MIB information; and receiving system information according to an indication of the second configuration information.

Embodiments of the present application further provide a storage medium including a computer-executable instruction, where the computer-executable instruction, when executed by a computer processor, is used for performing an information indication method applied to a first communication node. The method includes: sending first configuration information to a second communication node; and sending system information according to second configuration information determined according to a predefined conversion rule and the first configuration information, where each of the first configuration information and the second configuration information includes at least one of control resource set configuration information, search space configuration information, DMRS configuration information or a cellbarred indicator field in MIB information.

The term user equipment encompasses any suitable type of wireless user equipment, such as a mobile phone, a portable data processing apparatus, a portable web browser or a vehicle-mounted mobile station.

In general, multiple embodiments of the present application may be implemented in hardware, a dedicated circuit, software, logic or any combination thereof. For example, some aspects may be implemented in hardware while other aspects may be implemented in firmware or software that may be executed by a controller, a microprocessor or another computing apparatus, though the present application is not limited thereto.

Embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. A computer program may be stored in a memory. The memory may be of any type suitable to a local technical environment and may be implemented using any suitable data storage technology, such as, but not limited to, a read-only memory (ROM), a random-access memory (RAM) or an optical memory device and system (a digital video disc (DVD) or a compact disc (CD)). A computer-readable medium may include a non-transitory storage medium. A data processor may be of any type suitable to the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:
1. A method for determining information, the method comprising:
  receiving first control resource set configuration information sent by a first communication node;
  determining corresponding second control resource set configuration information according to a predefined conversion rule and the first control resource set configuration information, by:
    determining a mapping relationship between first-type configuration indexes and second-type configuration indexes,
    in a case where a configuration index corresponding to the first control resource set configuration information belongs to the first-type configuration indexes, determining a corresponding configuration index of the second-type configuration indexes according to the mapping relationship, and using configuration information of the corresponding configuration index of the second-type configuration indexes as the second control resource set configuration information; and receiving system information according to the second control resource set configuration information.

2. The method of claim 1, wherein determining the mapping relationship between the first-type configuration indexes and the second-type configuration indexes comprises:

predefining the mapping relationship between the first-type configuration indexes and the second-type configuration indexes.

3. The method of claim 1, wherein determining the corresponding second configuration information according to the predefined conversion rule and the first configuration information further comprises:

adjusting a number of symbols in a control resource set in the second configuration information.

4. The method of claim 3, wherein adjusting the number of symbols in the control resource set in the second configuration information comprises:

determining a number of symbols in a control resource set corresponding to a second communication node according to a number of resource bocks (RBs) in a control resource set in the first configuration information, a number of RBs in the control resource set in the second configuration information and a number of symbols in the control resource set in the first configuration information.

5. The method of claim 4, wherein determining the number of symbols in the control resource set corresponding to the second communication node according to the number of RBs in the control resource set in the first configuration information, the number of RBs in the control resource set in the second configuration information and the number of symbols in the control resource set in the first configuration information comprises:

the number of symbols in the control resource set corresponding to the second communication node being a product of a first RB ratio and the number of symbols in the control resource set in the first configuration information, wherein the first RB ratio is a ratio of the number of RBs in the control resource set in the first configuration information to the number of RBs in the control resource set in the second configuration information.

6. The method of claim 4, wherein determining the number of symbols in the control resource set corresponding to the second communication node according to the number of RBs in the control resource set in the first configuration information, the number of RBs in the control resource set in the second configuration information and the number of symbols in the control resource set in the first configuration information comprises:

the number of symbols in the control resource set corresponding to the second communication node being a larger value between the number of symbols in the control resource set in the second configuration information before adjustment and a product of a first RB ratio and the number of symbols in the control resource set in the first configuration information, wherein the first RB ratio is a ratio of the number of RBs in the control resource set in the first configuration information to the number of RBs in the control resource set in the second configuration information.

7. The method of claim 1, wherein the system information comprises an access indication information.

8. The method of claim 1, wherein determining, according to the first control resource set configuration information, a slot position where a physical downlink control channel (PDCCH) is monitored by the second communication node comprises:

calculating, according to the first control resource set configuration information, a slot index corresponding to the second communication node, wherein the slot index is an index, in a radio frame, of a slot where a monitoring occasion of the PDCCH corresponding to the second communication node is located.

9. The method of claim 8, wherein the slot index is calculated according to the following formula:

$$n_0 = (O \cdot 2^\mu + \text{offset1} + \lfloor i \cdot M \rfloor) \bmod N_{slot}^{frame,\mu};$$

wherein $\lfloor \ \rfloor$ denotes a floor operation, O denotes a first parameter, M denotes a second parameter, offset1 denotes a first preset offset related to M, $N_{slot}^{frame,\mu}$ denotes a number of slots comprised in the radio frame, i denotes an index of a synchronization signal block, $\mu$ and a subcarrier spacing satisfy a predefined correspondence relationship, and values of the first parameter and the second parameter are acquired from the first control resource set configuration information.

10. A method for indicating information, comprising:
sending first control resource set configuration information to a second communication node; and
sending system information according to second control resource set configuration information determined according to a predefined conversion rule and the first control resource set configuration information,
wherein the second control resource set configuration information is determined according to the predefined conversion rule and the first control resource set configuration information by:
determining a mapping relationship between first-type configuration indexes and second-type configuration indexes;
in a case where a configuration index corresponding to the first control resource set configuration information belongs to the first-type configuration indexes, determining a corresponding configuration index of the second-type configuration indexes according to the mapping relationship; and
using configuration information of the corresponding configuration index of the second-type configuration indexes as the second control resource set configuration information.

11. The method of claim 10, wherein determining the mapping relationship between the first-type configuration indexes and the second-type configuration indexes comprises:

predefining the mapping relationship between the first-type configuration indexes and the second-type configuration indexes.

12. The method of claim 10, wherein the system information comprises an access indication information.

13. An apparatus for indicating information, comprising:
a memory storing instructions; and
a processor in communication with the memory, wherein, when the processor executes the instructions, the processor is configured to cause the apparatus to perform:
receiving first control resource set configuration information sent by a first communication node, determining corresponding second control resource set configuration information according to a predefined conversion rule and the first control resource set configuration information, by:
  determining a mapping relationship between first-type configuration indexes and second-type configuration indexes,
  in a case where a configuration index corresponding to the first control resource set configuration information belongs to the first-type configuration indexes, determining a corresponding configuration index of the second-type configuration indexes according to the mapping relationship, and
  using configuration information of the corresponding configuration index of the second-type configuration indexes as the second control resource set configuration information, and
receiving system information according to the second control resource set configuration information.

14. The apparatus of claim 13, wherein determining the mapping relationship between the first-type configuration indexes and the second-type configuration indexes comprises:
predefining the mapping relationship between the first-type configuration indexes and the second-type configuration indexes.

15. An apparatus for indicating information, comprising:
a memory storing instructions; and
a processor in communication with the memory, wherein, when the processor executes the instructions, the processor is configured to cause the apparatus to perform:
  sending first control resource set configuration information to a second communication node, and
  sending system information according to second control resource set configuration information determined according to a predefined conversion rule and the first control resource set configuration information,
  wherein the second control resource set configuration information is determined according to the predefined conversion rule and the first control resource set configuration information by:
    determining a mapping relationship between first-type configuration indexes and second-type configuration indexes;
    in a case where a configuration index corresponding to the first control resource set configuration information belongs to the first-type configuration indexes, determining a corresponding configuration index of the second-type configuration indexes according to the mapping relationship; and
    using configuration information of the corresponding configuration index of the second-type configuration indexes as the second control resource set configuration information.

16. The apparatus of claim 15, wherein determining the mapping relationship between the first-type configuration indexes and the second-type configuration indexes comprises:
predefining the mapping relationship between the first-type configuration indexes and the second-type configuration indexes.

* * * * *